United States Patent Office 2,757,770
Patented Aug. 7, 1956

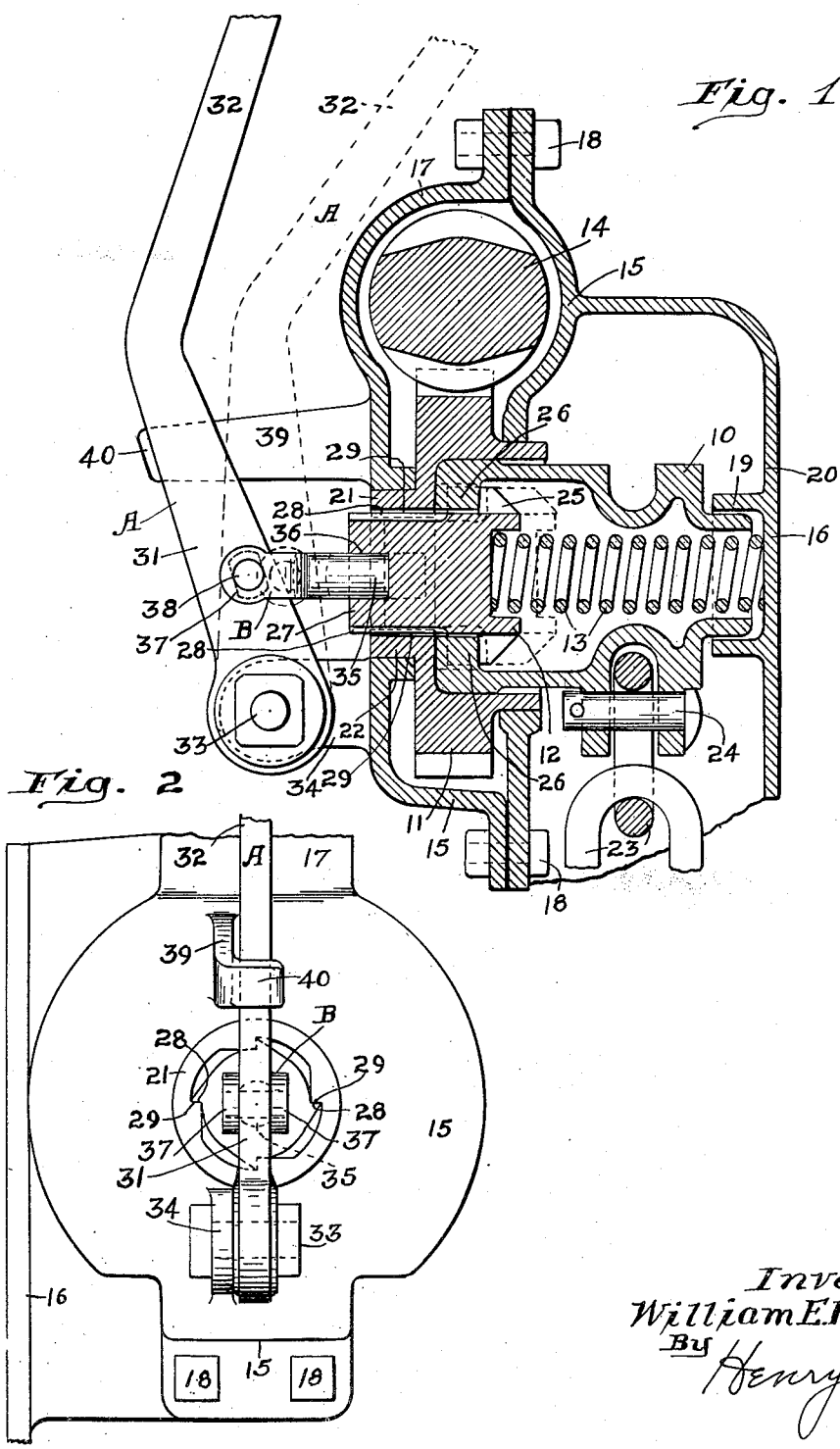

2,757,770
CLUTCH ACTUATING MEANS FOR GEAR DRIVEN HAND BRAKES

William E. Robertson, Wilmette, Ill., assignor to W. H. Miner, Inc., Chicago, Ill., a corporation of Delaware Application July 14, 1950, Serial No. 173,831

1 Claim. (Cl. 192—99)

This invention relates to improvements in clutch shifting or actuating means for power multiplying worm gear driven hand brakes for railway cars.

One object of the invention is to provide simple and efficient lever means for shifting the clutch member of a worm gear operated hand brake mechanism, to disengaged position, to effect release of the brakes.

Other objects of the invention will more clearly appear from the description and claim hereinafter following.

In the accompanying drawing forming a part of this specification, Figure 1 is a transverse, vertical sectional view of a power multiplying worm gear driven hand brake mechanism, illustrating my improvements in connection therewith. Figure 2 is a side elevational view of Figure 1, looking from left to right in said figure.

In the present instance, my improved clutch shifting means is shown as applied to a hand brake mechanism of the power multiplying, worm gear operated type, similar to the brake mechanism shown in Patent No. 2,121,095, dated June 21, 1938, granted to Roland J. Olander, and comprises a chain winding drum 10, a worm wheel 11, a sliding clutch member 12 operatively connecting the drum to the worm wheel, a spring 13 for urging the clutch member into operative engaged position with respect to the drum, and a worm 14 meshing with the worm wheel 11 and actuated by the usual hand wheel, not shown.

In carrying out my invention, I provide a housing 15 for the operating parts of the brake mechanism, comprising a main section 16 and a cover plate section 17 secured to the main section by bolts 18—18.

My improved clutch shifting means comprises broadly a lever A pivotally supported at its lower end on the housing, and a short push rod B connected to the lever and engaged with the clutch member 12.

As shown in the drawing, the chain winding drum 10 is rotatably supported at its right hand end by bearing means 19 on the vertical wall 20 at the right hand side of the housing, as seen in Figure 1. The opposite end of the drum is rotatably supported by the worm wheel 11, which has hollow hubs 21 and 22 at opposite sides, journaled in the cover plate section 17 and the main section 16, respectively, of said housing. As shown, the left hand end portion of the drum 10 is rotatably supported in the hub 22 of the worm wheel 11.

The brake chain, which is indicated by 23, is windable on the drum to tighten the brakes and is shown as anchored to the drum by a pin 24.

The clutch member 12 has clutch teeth 25 at its inner end, engageable with interior clutch teeth 26 on the drum 10. The clutch member 12 has a cylindrical shank 27 splined to the worm wheel 11 for sliding movement, the shank 27 being provided with ribs 28 which are slidingly engaged in interior slots 29 provided on the hub 21 of the worm wheel. As shown, the shank 27 normally projects outwardly of the housing cover plate section 17 and the clutch member is held in its operatively engaged position by the coil spring 13 disposed within the drum 10 and buttressed against the inner end of said clutch member.

The clutch shifting lever A comprises an upstanding lower end section 31 and an upper operating handle section 32, which is angularly disposed with respect to said lower section. The lower end of the section 31 is pivotally supported on the housing 15 by a pivot pin or bolt 33 extending through the lower end of said section 31 and an outstanding lug 34 on the housing cover plate section 17 near the bottom portion of said section.

The push rod B has a cylindrical shank portion 35 at its inner end seated in an axial socket 36 in the projecting end of the clutch member 12. At the other end, the push rod B has a fork portion comprising spaced arms 37—37 embracing opposite sides of the lever section 31. The rod B is pivotally connected to the section 31 of the lever A by a pivot pin 38, extending through said section and the arms 37—37 of said fork.

Swinging movement of the lever A toward the left, as viewed in Figure 1, is limited by a stop 39 in the form of an outstanding arm on the housing cover plate section 17, having a right angular, inturned flange 40 at its outer end with which the outer edge of the upper end portion of the section 31 of the lever A is engageable.

As will be evident, the spring 13 normally holds the clutch teeth 25 of the clutch member 12 engaged with the clutch teeth of the drum 10 to effect rotation of the drum in unison with the worm wheel 11.

To effect release of the brakes, the lever A is swung toward the right from the full line to the dotted line position shown in Figure 1, thereby moving the push rod B toward the right and forcing the clutch member 12 to disengaged position with respect to the drum 10. When the clutch member has been completely disengaged, the drum 10 is freely rotatable to permit unwinding of the chain 23 and release of the brakes.

When the lever A is released, the expansive action of the spring 13 returns the parts to the normal full line position shown in Figure 1, swinging movement of the lever A to the left being positively limited by the stop 39, thereby preventing accidental disengagement of the push rod B from the clutch member 12.

I claim:

In a mechanism of the character described, the combination with a rotatable clutch member shiftable in lengthwise direction to be engaged with and disengaged from a cooperating rotatable clutch element, said clutch member having an axial bearing seat in one end thereof; of a coil spring bearing on the other end of said rotatable clutch member; a fixed spring abutment engaged by the other end of said spring; an upright lever pivotally supported at its lower end; and a push rod connected at one end to said lever above said pivoted end thereof, said push rod having the other end thereof journaled in the bearing seat of said rotatable member.

References Cited in the file of this patent
UNITED STATES PATENTS

| | | |
|---|---|---|
| Re. 15,225 | Jarvis | Nov. 15, 1921 |
| 179,869 | Sanford | July 18, 1876 |
| 297,489 | Bell | Apr. 22, 1884 |
| 315,193 | Warner | Apr. 7, 1885 |
| 512,258 | Murrey | Jan. 2, 1894 |
| 513,148 | Salmon | Jan. 23, 1894 |
| 564,488 | Johnson | July 21, 1896 |
| 958,049 | Werner | May 17, 1910 |
| 1,037,680 | Spitzenberg | Sept. 3, 1912 |
| 1,226,139 | Stebbins | May 15, 1917 |
| 1,877,330 | Johnson | Sept. 13, 1932 |
| 2,160,279 | Olander | May 30, 1935 |
| 2,423,043 | Olstad | June 24, 1947 |
| 2,439,941 | Lounsbury | Apr. 20, 1948 |